(12) United States Patent
Hanberg

(10) Patent No.: US 7,026,700 B2
(45) Date of Patent: Apr. 11, 2006

(54) PHOTODETECTOR WITH POLARIZATION STATE SENSOR

(75) Inventor: Peter Jesper Hanberg, Soborg (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/877,260

(22) Filed: Jun. 24, 2004

(65) Prior Publication Data

US 2005/0285164 A1   Dec. 29, 2005

(51) Int. Cl.
*H01L 31/00* (2006.01)
(52) U.S. Cl. .................. 257/436; 257/440; 257/459
(58) Field of Classification Search .............. None
See application file for complete search history.

(56) References Cited

U.S. PATENT DOCUMENTS

| | | | |
|---|---|---|---|
| 5,090,790 A | 2/1992 | Zucker | |
| 5,117,469 A | 5/1992 | Cheung et al. | |
| 5,793,511 A | 8/1998 | Bulow | |
| 5,793,790 A * | 8/1998 | Doi et al. | 372/50.1 |
| 5,991,487 A * | 11/1999 | Sugiyama | 385/129 |
| 6,496,291 B1 | 12/2002 | Raj et al. | |
| 6,498,873 B1 | 12/2002 | Chandrasekhar et al. | |
| 2004/0051165 A1* | 3/2004 | Boisvert | 257/622 |
| 2004/0052466 A1 | 3/2004 | Nicolaescu et al. | |
| 2004/0229469 A1* | 11/2004 | Marsh et al. | 438/708 |
| 2005/0056312 A1* | 3/2005 | Young et al. | 136/258 |
| 2005/0161695 A1* | 7/2005 | Wipiejewski | 257/103 |

OTHER PUBLICATIONS

"10 Gb/s Optical Transceivers: Fundamentals and Emerging Technologies," Intel Technology Journal, Optical Technologies and Application, vol. 08, Issue 02, May 10, 2004, pp. 83-100.

"Light without Limits: Taming Dispersion in Tomorrow's High-Speed Networks," Web ProForum Tutorials, The International Engineering Consortium, 20 pgs.

* cited by examiner

*Primary Examiner*—Ngân V. Ngô
(74) *Attorney, Agent, or Firm*—Schwabe, Williamson & Wyatt

(57) ABSTRACT

Embodiments of the present invention include an apparatus, method, and system for a photodetector with a polarization state sensor.

16 Claims, 2 Drawing Sheets

PHOTODETECTOR WITH POLARIZATION STATE SENSOR

FIELD OF THE INVENTION

Disclosed embodiments of the present invention relate to optical networks, and more particularly to a photodetector having a polarization state sensor.

BACKGROUND OF THE INVENTION

Optical networks are progressively sending data signals at higher transmission rates and over longer distances. However, certain limitations affecting the signal integrity of the optical transmissions have begun to emerge. One such limitation is polarization mode dispersion (PMD).

An optical beam may travel in multiple polarization modes through a light transmission guide. For example, an optical beam may have a transverse magnetic (TM) polarization mode and an orthogonal transverse electrical (TE) polarization mode. Although these polarization modes naturally travel at the same speed, certain conditions could cause one of the modes to travel faster than the other resulting in PMD. PMD may result from slight irregularities in the structure of the fiber as well as mechanical stress upon the fiber caused by, for example, bending, vibrations, and thermal cycling. Because of the mechanical and structural sensitivity of the optical pulses sent through stretches of fiber, PMD has been proven difficult to compensate for. The effects of PMD will become more pronounced as optical networks proceed from 10 Gb/s to 40 Gb/s and beyond.

BRIEF DESCRIPTION OF THE DRAWINGS

Embodiments of the invention are illustrated by way of example and not by way of limitation in the figures of the accompanying drawings, in which the like references indicate similar elements and in which.

DETAILED DESCRIPTION

A method, apparatus, and system for a photodetector with a polarization state sensor is disclosed herein. In the following detailed description, reference is made to the accompanying drawings that form a part hereof wherein like numerals designate like parts throughout. The drawings may show, by way of illustration, specific embodiments in which the invention may be practiced. However, it is to be understood that other embodiments may be utilized and structural or logical changes may be made without departing from the scope of the embodiments of the present invention. It should also be noted that directions and references (e.g., up, down, top, bottom, etc.) might be used to facilitate the discussion of the drawings but are not intended to restrict the application of the embodiments of this invention. Therefore, the following detailed description is not to be taken in a limiting sense and the scope of the embodiments of the present invention are defined by the appended claims and their equivalents.

Figure 1:
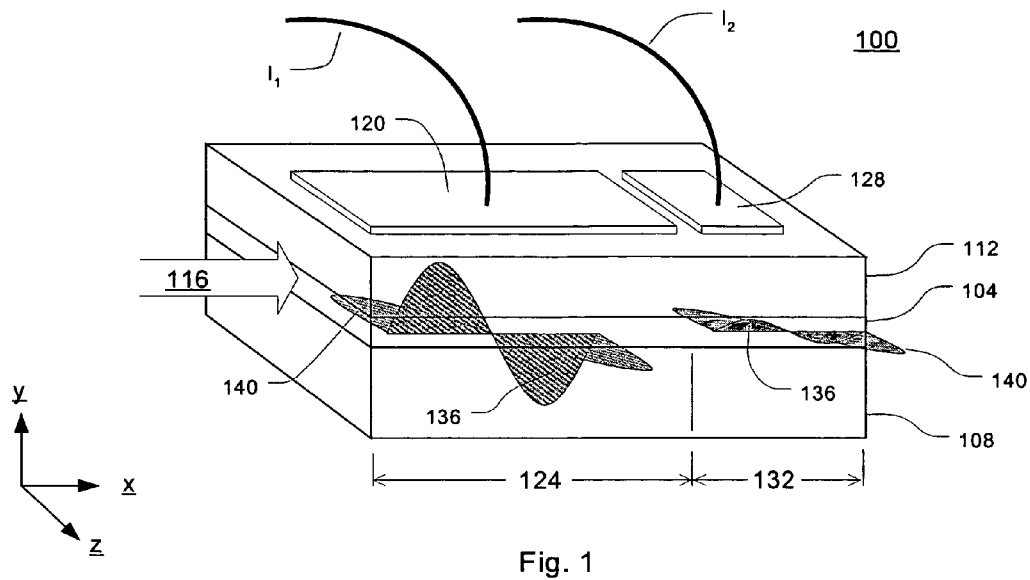
FIG. 1 illustrates a perspective view of a photodetector including a polarization state sensor, in accordance with an embodiment of the present invention.

FIG. 1 illustrates a perspective view of a photodetector 100 with a polarization state sensor to detect changes in the polarization of incoming optical signals, in accordance with an embodiment of the present invention. In particular, the photodetector 100 includes an absorption layer 104 that is disposed between a bottom layer 108 and a top layer 112. The absorption layer may receive an incoming optical signal 116 and facilitate the conversion of photons of the optical signal 116 into photocurrent. In one embodiment, the optical signal 116 may travel through a light transmission guide that is optically coupled to the absorption layer 104. The photodetector 100 as described may be referred to as an edge detector; however, other embodiments of the present invention may include other types of photodetectors.

In one embodiment, the bottom layer 108 may be composed of an N-type doped semiconductor material and the top layer 112 may be composed of a P-type doped semiconductor material. In another embodiment, these layers may be reversed. In various embodiments, the top and bottom layers 108 and 112 may be made of semiconductor material including, but not limited to, Indium Phosphide (InP), Gallium Arsenide (GaAs), Silicon (Si), and Germanium (Ge).

In one embodiment the absorption layer 104 may be referred to as an intrinsic layer and the photodetector 100 may be a p-i-n photodiode. Examples of other types of photodiodes suitable for embodiments of the present invention include, but are not limited to p-n photodiodes and avalanche photodiodes.

In one embodiment, the absorption layer 104 may include quantum wells. A quantum well absorption layer may be composed of numerous alternating layers of, for example, GaAs and aluminum gallium arsenide (AlGaAs) or indium gallium arsenide (InGaAs) and indium gallium arsenide phosphorous (InGaAsP), etc. By doing so, the spectral response of the absorption layer 104 may be controlled by adjusting the composition of the layers and by adjusting the thickness of the layers during growth.

In one embodiment, first and second electrical contacts 120 and 128 may be coupled to the absorption layer 104 through the top layer 112. The first electrical contact 120 may be adapted to manifest a photocurrent $I_1$ that is generated by the optical signal 116 as it travels through a first section 124 of the absorption layer 104. Likewise, the second electrical contact 128 may be adapted to manifest photocurrent $I_2$ that is generated by the optical signal 116 as it travels through a second section 132 of the absorption layer 104. The photocurrents $I_1$ and $I_2$ may be electrical signals whose magnitudes correspond with the intensity of the optical signal 116 through the respective sections 124 and 132.

As the optical signal 116 enters into the absorption layer 104 it may include two polarizations. Referring to the reference x-, y-, z-coordinate system, the optical signal 116 traveling in the x-direction may include, for example, a transverse magnetic (TM) polarization mode 136 in the y-plane and a transverse electrical (TE) polarization mode 140 in the z-plane. The orientation of the TM and the TE polarizations are illustrative and not restrictive.

In one embodiment, the absorption layer 104 may be designed to absorb the TM and the TE polarization modes 136 and 140 at different absorption rates $\alpha_{TM}$ and $\alpha_{TE}$, respectively. In the illustrated embodiment, the absorption rate $\alpha_{TM}$ may be larger than the absorption rate $\alpha_{TE}$ due, at least in part, to the asymmetrical dimensions of the absorption layer 104. For example, in one embodiment, the larger absorption rate $\alpha_{TM}$ may result from the TE polarization mode 140 being less constrained in the z-dimension of the absorption layer 104 than the TM polarization mode 136 is constrained by the y-dimension of the absorption layer 104.

The photocurrent $I_1$ that is generated through the first section 124 may measure the overall intensity of the optical signal 116, which may represent the data carried by the optical signal 116. The length of the first section 124 may be designed such that majority of the TM polarization mode 136 is absorbed by the end of the first section 124. The residual photocurrent $I_2$ may therefore be generated mostly by the (less absorbed) TE polarization mode 140 traveling through the second section 132. Thus, the photocurrent $I_2$ may facilitate the detection of changes in the relative polarization modes of the optical signal by monitoring the relative changes of $I_2$. The relative lengths of the sections 124 and 132 may be adjusted to accommodate the particular characteristics of an embodiment.

In one embodiment, a polarization state variable may be generated by computing the ratio of $I_2$ to the total photocurrent $(I_1+I_2)$. This may ensure that a change in the intensity of the optical signal 116 would not be misinterpreted as a change in the relative polarization modes.

In one embodiment, the photocurrent $I_2$ generated through the second section 132 may be relatively small. However, since polarization modes of the optical signal 116 may change slowly over time, it may be possible to integrate this photocurrent over time in order to gain sensitivity. For example in one embodiment, with a data transmission rate of 10 Gb/s, integrating $I_2$ over 1 second may gain a factor of $10^8$ in sensitivity. Various embodiments may integrate over different time periods, including time periods of a much smaller scale.

Figure 2:
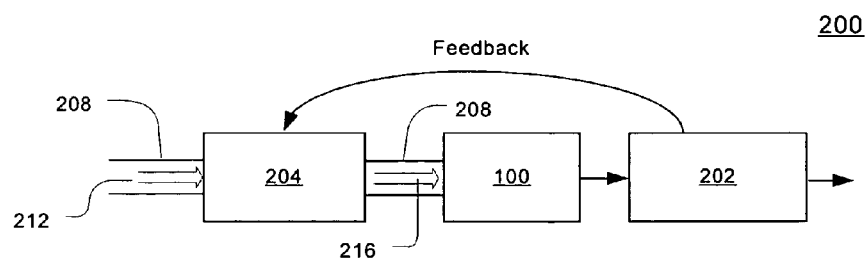
FIG. 2 illustrates an optical receiver module with an electronic and an optical compensator, in accordance with an embodiment of the present invention.

FIG. 2 illustrates an optical receiver module 200, in accordance with an embodiment of the present invention. In this embodiment the optical receiver module 200 may include an electronic compensator circuit 202 and an optical compensator 204 to compensate for polarization mode dispersion of an incoming optical signal 212. The optical compensator 204 may be coupled with a light transmission guide 208 to receive the incoming optical signal 212 and transmit a compensated optical signal 216 to the photodetector 100 through the light transmission guide 208 or by some other means. The photodetector 100 may receive the compensated optical signal 216 and output $I_1$ and $I_2$ in a manner similar to the above discussion.

In one embodiment, the electronic compensator circuit 202 may receive the output photocurrents $I_1$ and $I_2$ and determine the polarization state variable in a manner similar to the above discussion. If the polarization state variable changes more than a predetermined amount, then the electronic compensator circuit 202 may generate a control signal to facilitate the adjustment of the incoming optical signal 212. The control signal may then be sent as feedback to the optical compensator 204 to control the adjustment of the optical signal by electrical and/or mechanical means, thereby compensating for the distortion of an optical signal in the optical domain.

In one embodiment, the optical compensator 204 may adjust the relative polarization modes of the incoming optical signal by physically manipulating the light transmission guide 208, for example, by bending or squeezing the guide 208 in a particular direction. In other embodiments, the optical compensator 204 may include adaptive optics to realign and adjust the pulses of dispersed optical bits. The relative polarization modes may be iteratively adjusted until the polarization state variable is within the predetermined range, which will be dependent on factors of a particular embodiment. In such a manner, the electronic compensator circuit 202 may facilitate the output of a signal representative of the data that is to be transmitted by the incoming optical signal 212.

Figure 3:
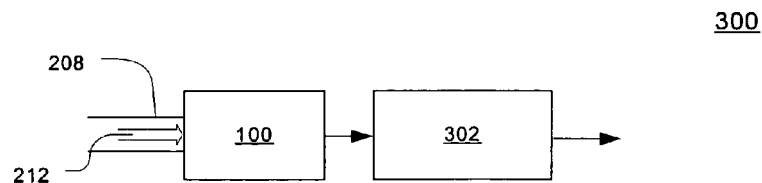
FIG. 3 illustrates an optical receiver module with an electronic compensator circuit, in accordance with an embodiment of the present invention.

FIG. 3 illustrates an optical receiver module 300 with an electronic compensator circuit 302 in accordance with an embodiment of the present invention. In this embodiment, if the polarization state variable is within the predetermined range the electronic compensator circuit 302 may facilitate the output of $I_1$ as being representative of the data transmitted by the incoming optical signal 212. However, if the polarization state variable is outside of the predetermined range, then the electronic compensator circuit 302 may employ one of a number of corrective measures to recover the data signal from a polarization dispersed incoming optical signal 212. In this manner, the distortion of an optical signal may be compensated for in the electrical domain.

Measures used to recover a data signal from a polarization dispersed optical carrier may be collectively referred to as electronic dispersion compensation (EDC). Integrated circuits (ICs) implementing EDC measures may include but is not limited to feed forward equalizers (FFE), decision feedback equalizers (DFE) (also known as feedback equalizers (FBE)), and maximum likelihood sequence detectors (MLSD). In various embodiments, EDC ICs may recover the data signal from a distorted incoming optical signal by using adaptive filter techniques implementing various adaptive algorithms.

In various embodiments, the optical receiver module 200 of FIG. 2 may additionally/alternatively employ one or more EDC measures in conjunction with the optical compensator 204. In one embodiment, relatively large adjustments to the signal may be made in the optical domain, while fine-tuning may be made in the electrical domain, or vice versa.

Figure 4:
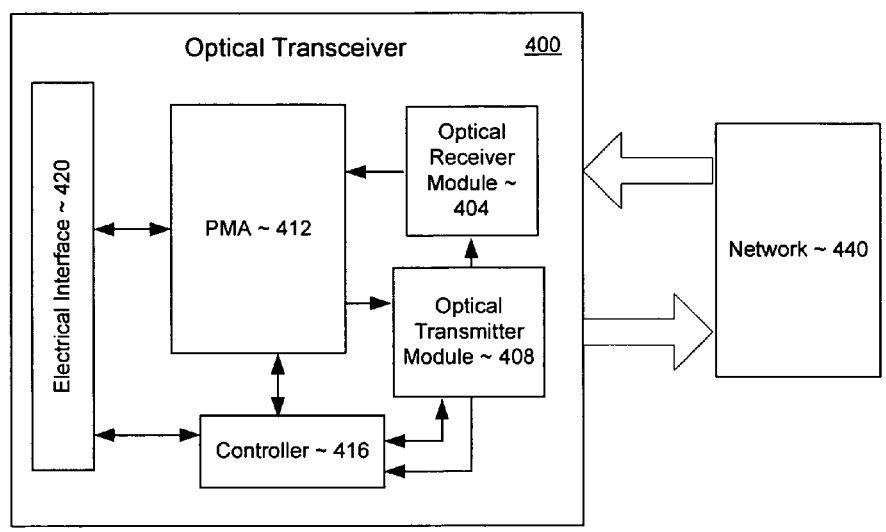
FIG. 4 illustrates an optical transceiver, in accordance with an embodiment of the present invention.

FIG. 4 illustrates an optical transceiver 400 in accordance with an embodiment of the present invention. In various embodiments, the optical transceiver 400 may include an optical receiver module 404, an optical transmitter module 408, a physical medium attachment 412, a controller 416, and an electrical interface 420 coupled together as shown.

The optical receiver module 404 and the optical transmitter module 408 may work together to facilitate the transmission of e-mail, video, multimedia, data, and voice between the transceiver 400 and the optical network 440. In various embodiments, the optical network 440 may be a wide area network (WAN), a local area network (LAN), a telephone network, and so forth. In various embodiments the network 440 may be, but is not limited to, a synchronous digital hierarchy (SDH) network, a synchronous optical network (SONET), an optical transport network, and an ethernet network. The network 440 may be a private and/or public network.

The optical receiver module 404 may have a photodetector similar to the photodetector 100 described above. In various embodiments the optical receiver module 404 may be similar to either of the optical receiver modules 200 or 300. Additionally, in some embodiments the optical receiver module 404 may include other functional components such as, but not limited to, a transimpedance amplifier and a clock recovery circuit.

In one embodiment, the physical medium attachment (PMA) may be used to facilitate optical/electrical communications. The physical medium attachment (PMA) 412 may include multiplexing and demultiplexing functions that may be necessary in, for example, time division multiplexed (TMD) or dense wavelength division multiplexed (DWDM) systems. In an embodiment, the PMA 412 may also be used in setting the jitter parameters of the transceiver 400. In other embodiments, e.g., embodiments with lower data transmission rates, the PMA 412 may not be used. In various embodiments, the multiplexing and demultiplexing functions may take place in the optical transmitter module 408 and the optical receiver module 404, respectively. Additionally, in various embodiments some or all of the compensation circuitry may be included in the PMA 412.

In various embodiments, the tasks performed by the controller 416 may include setting control parameters for the PMA 412, the optical receiver module 404, and an optical transmitter module 408. In one embodiment, these control parameters may vary with time and temperature or when a communication system changes the link configuration (i.e., loopback modes).

In one embodiment, the electrical interface 420 may provide the optical transceiver 400 with, for example, input/output data transfer with a data routing subsystem, various clocking channels, control and monitoring channels, and DC power and ground connections.

Figure 5:
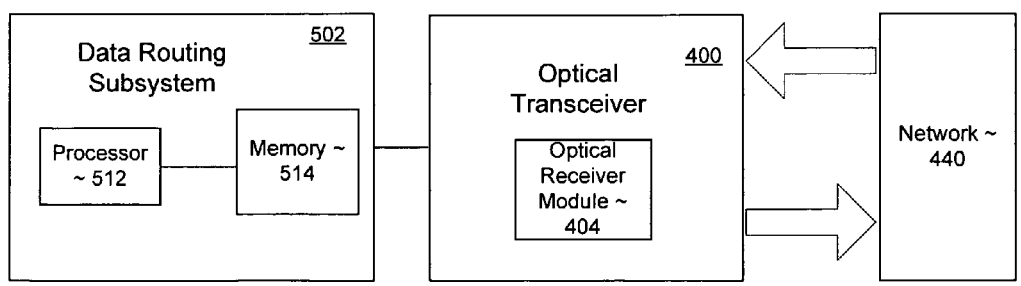
FIG. 5 illustrates a communication system, in accordance with an embodiment of the present invention.

FIG. 5 illustrates an example communication system, in accordance with one embodiment. As illustrated, example system 500 includes a data routing subsystem 502 and the optical transceiver 400 coupled to each other as shown. The optical transceiver 400 may optically couple the communication system 500 to the network 440. The optical receiver module 404 may include a photodetector similar to the photodetector 100 described in the above embodiments.

In one embodiment, the data routing subsystem 502 includes processor 512 and memory 514 coupled to each other as shown. Memory 514 has stored therein a number of data routing rules, according to which processor 512 routes data received through the optical transceiver 400. The data routing rules may be stored employing any one of a number of data structure techniques, e.g., tables, link lists, and so forth. The data may be received and forwarded in accordance with any one of a number of communication protocols including, but not limited to, the Transmission Control Protocol/Internet Protocol (TCP/IP).

Except for the incorporation of the photodetector with the optical transceiver 400, the elements of the system 500 represent a broad range of elements known in the art or to be designed.

In various embodiments, examples of the system 500 may be a router, a switch, a gateway, a server, a regenerator, and so forth.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
   an absorption layer adapted to receive an optical signal;
   a first electrical contact coupled to the absorption layer and adapted to manifest a first electrical signal that is based upon an overall intensity of the optical signal through a first section of the absorption layer;
   a second electrical contact coupled to the absorption layer and adapted to manifest a second electrical signal that is based upon an overall intensity of the optical signal through a second section of the absorption layer; and
   the first section arranged to receive the optical signal prior to the second section.

2. The apparatus of claim 1, wherein the optical signal comprises first and second polarization modes and the absorption layer is further adapted to absorb the first and second polarization modes at different rates.

3. The apparatus of claim 2, further comprising:
   a first semiconductor layer;
   a second semiconductor layer, coupled with the first and the second detectors; and
   the absorption layer disposed between the first and the second semiconductor layers.

4. The apparatus of claim 3, wherein the first and the second layers comprise N- and P-type doped semiconductor material, respectively.

5. The apparatus of claim 4, wherein
   the first and second semiconductor layers include Indium Phosphide; and
   the absorption layer includes Indium Gallium Arsenide.

6. The apparatus of claim 2, further comprising:
   an electronic compensator circuit adapted to receive the first and second electrical signals; compensate for polarization dispersion based at least in part on the first and second electrical signals; and output a data signal representative of the data transmitted by the optical signal.

7. The apparatus of claim 6, wherein the electronic compensator circuit is adapted to compensate for polarization dispersion based at least in part on a ratio of the second electrical signal to the combination of the first and second electrical signals.

8. The apparatus of claim 6, wherein the electronic compensator circuit is adapted to compensate for polarization dispersion by generating a control signal and the apparatus further comprising:
   an optical compensator adapted to adjust the first and second polarization modes of the optical signal based, at least in part, on the control signal.

9. A system comprising:
   a data routing subsystem including memory having a plurality of data routing rules, and a processor coupled to the memory to route a data signal based at least in part on the data routing rules; and
   an optical transceiver including
      an electrical interface, coupled to the data routing subsystem, to facilitate the communication of data with the data routing subsystem; and
      a photodetector having
         an absorption layer adapted to receive an optical signal;
         a first electrical contact coupled to the absorption layer and adapted to manifest a first electrical signal that is based upon an overall intensity of the optical signal through a first section of the absorption layer;

a second electrical contact coupled to the absorption layer and adapted to manifest a second electrical signal that is based upon an overall intensity of the optical signal through a second section of the absorption layer; and the first section arranged to receive the optical signal prior to the second section.

10. The system of claim 9, wherein the optical signal comprises first and second polarization modes and the absorption layer is adapted to absorb the first and second polarization modes at different rates.

11. The system of claim 10, wherein the optical transceiver further comprises:

an electronic compensator circuit coupled to the photodetector and adapted to receive the first and second electrical signals, to compensate for polarization dispersion based at least in part on the first and second electrical signals, and to output the data signal representing data transmitted by the optical signal; and the electrical interface being adapted to facilitate the transmission of the data signal from the electronic compensator circuit to the data routing subsystem.

12. The system of claim 11, wherein the electronic compensator circuit is adapted to compensate for polarization dispersion based at least in part on a ratio of the second electrical signal to the combination of the first and second electrical signals.

13. The system of claim 11, wherein the electronic compensator circuit is adapted to compensate for polarization dispersion by generating a control signal and the optical transceiver further comprising:

an optical compensator adapted to adjust a first and second polarization modes of the optical signal based at least in part on the control signal.

14. The system of claim 9, wherein the system comprises a selected one of a group consisting of a router, a switch, a gateway, and a server.

15. The apparatus of claim 1, wherein the first section is a first size and the second section is a second size that is less than the first size.

16. The apparatus of claim 2, wherein the optical signal is primarily composed of the second polarization mode through the second section.

* * * * *